United States Patent
Breskman

(10) Patent No.: US 6,627,685 B2
(45) Date of Patent: Sep. 30, 2003

(54) LIGHTFAST EPOXY RESIN

(76) Inventor: Ellis Breskman, 3055 Whisper Woods Dr., Apartment 363, Ann Arbor, MI (US) 48105

( * ) Notice: Subject to any disclaimer, the term of this patent is extended or adjusted under 35 U.S.C. 154(b) by 0 days.

(21) Appl. No.: 10/218,817

(22) Filed: Aug. 14, 2002

(65) Prior Publication Data

US 2003/0036623 A1 Feb. 20, 2003

Related U.S. Application Data

(60) Provisional application No. 60/312,446, filed on Aug. 14, 2001.

(51) Int. Cl.[7] .............................. C08K 3/36; C08L 63/02
(52) U.S. Cl. ........................ 523/466; 549/514; 549/518; 549/539; 549/540; 549/561
(58) Field of Search ................................. 549/514, 515, 549/518, 521, 539, 540, 561; 523/400, 466

(56) References Cited

U.S. PATENT DOCUMENTS 2,518,056 A  *  8/1950  Pechukas .................... 549/518
3,220,974 A      11/1965  Fox
3,261,808 A       7/1966  Schnell

FOREIGN PATENT DOCUMENTS

EP         0 280 067 A2     8/1988

* cited by examiner

*Primary Examiner*—Robert Dawson
*Assistant Examiner*—D. Aylward
(74) *Attorney, Agent, or Firm*—Carlson, Gaskey & Olds

(57) ABSTRACT

A lightfast epoxy resin is formed by phosgenating Bisphenol A by reaction with phosgene to produce Bisphenol A bischloroformate. The Bisphenol A bischloroformate is then reacted with either epichlorohydrin, glycidol or pinacol and another chemical to produce a lightfast epoxy resin. By phosgenating the Bisphenol A prior to the reaction with either epichlorohydrin, glycidol or pinacol and another chemical, the resulting epoxy resin has improved lightfastness and is not degraded by sunlight. The epoxy resin of the present invention can be used in paints, coatings, and plastics for vehicles.

20 Claims, 2 Drawing Sheets

LIGHTFAST EPOXY RESIN

This application claims priority to U.S. Provisional Application No. 60/312,446 filed on Aug. 14, 2001.

BACKGROUND OF THE INVENTION

The present invention relates generally to a lightfast epoxy resin formed from phosgenated Bisphenol A which is employed as a sunlight resistant vehicle paint or coating.

The sheet metal of a vehicle is usually coated with paint to enhance vehicle appearance and to provide corrosion protection. The paint is composed of powder mixed with an epoxy resin. The epoxy resin is commonly formed by the reaction of Bisphenol A and epichlorohydrin. Epichlorohydrin includes an oxirane ring, which is known as the epoxy group. Bisphenol A contains benzene rings. As with most chemicals with benzene rings, Bisphenol A absorbs actinic ultraviolet light in the range of 280 to 310 nm and is therefore not lightfast and not durable to ultraviolet light. Therefore, the prior art paints employing an epoxy resin composed of Bisphenol A and epichlorohydrin tend to chalk outdoors when exposed to sunlight. To increase gloss retention and reduce fading, paint is usually applied to the vehicle in two coats. As epichlorohydrin is transparent to sunlight, the lack of sunlight resistance is due to the Bisphenol A. In the prior art, resins including phosgenated Bisphenol A have been used as a photoresist for printing.

Polycarbonate is a polymer which contains phosgenated Bisphenol A and is resistant to sunlight. Polycarbonate is lightfast because the Bisphenol A is phosgenated. When exposed to sunlight, the phosgene of the polycarbonate undergoes a Photo-Fries rearrangement to form alpha hydroxy benzophenone, the ingredient found in suntan location. The alpha hydroxy benzophenone is stabilized by a mechanism called phototaumerism. Due to phosgenation of the Bisphenol A in polycarbonate, the properties of polycarbonate change slowly during ultraviolet irradiation. Although polycarbonate resins are sunlight resistant, polycarbonate is not used in coatings because of its large molecule size and high molecular weight.

SUMMARY OF THE INVENTION

This invention relates to a method of forming a lightfast epoxy resin which can be used as a sunlight resistant paint or coating on a vehicle. Bisphenol A is phosgenated by a reaction with phosgene to produce Bisphenol A bischloroformate, which includes a phosgene moiety on each end.

The Bisphenol A bischloroformate is then reacted with another chemical to produce a lightfast epoxy resin. The chemical can be epichlorohydrin, glycidol, or pinacol. If the Bisphenol A bischloroformate is reacted with either epichlorohydrin or glycidol, an epoxy resin is produced. The Bisphenol A bischloroformate can also be reacted with pinacol to produce a building block which can be reacted with epichlorohydrin or glycidol to produce an epoxy resin having an increased viscosity.

When exposed to ultraviolet light, the phosgene moiety in the epoxy resin undergoes a Photo-Fries rearrangement to form an alpha hydroxy benzophenone, the ingredient found in suntan lotion. Alpha hydroxy benzophenone is stabilized by a mechanism called phototaumerism. In phototaumerism, the hydrogen of the hydroxy group wiggles and dissipates heat as energy, stabilizing the alpha hydroxy benzophenone and reducing degradation by sunlight.

By phosgenating the Bisphenol A prior to the reaction with an additional chemical, the resulting epoxy resin has improved lightfastness and is not degraded by sunlight. The epoxy resin of the present invention can be used in paints, coatings, and plastics on vehicles, such as boats, cars and planes.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
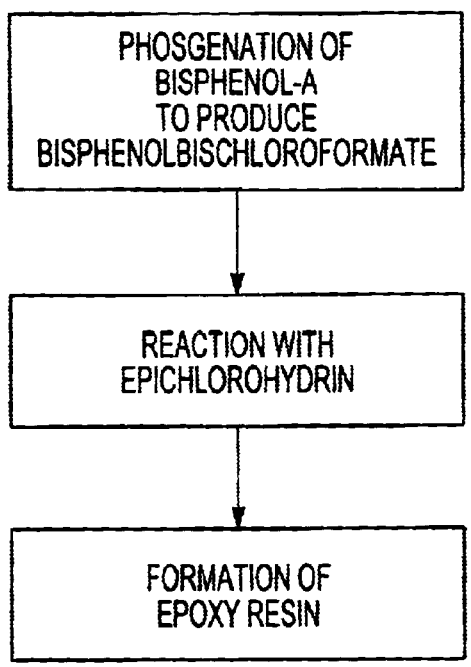
FIG. 1 illustrates a flow chart of a first example method of forming the lightfast epoxy resin of the present invention.

FIG. 1 illustrates a flow chart of a first example of a method of forming the lightfast epoxy resin of the present invention. Bisphenol A, a phenol including a benzene ring, is first reacted with phosgene. Phosgene is a relatively inexpensive, toxic, and highly reactive substance which includes a carbon atom double bonded to an oxygen atom and bonded to two chloride ions. The phosgene reacts with both ends of the Bisphenol A, producing Bisphenol A bischloroformate. The resulting Bisphenol A bischloroformate includes a phosgene moiety on each end.

The Bisphenol A bischloroformate is then reacted with epichlorohydrin to produce diglycidal ether of Bisphenol A bischloroformate, a light fast epoxy resin. The epichlorohydrin includes an oxirane ring which is known as the epoxy group, and attaches to opposing ends of the Bisphenol A bischloroformate. The epichlorohydrin reacts with the Bisphenol A bischloroformate with a high yield, producing an epoxy resin having excellent viscosity and good processing properties. The epoxy resin formed by reaction with epichlorohydrin has good room temperature reactivity and is viscous.

Figure 2:
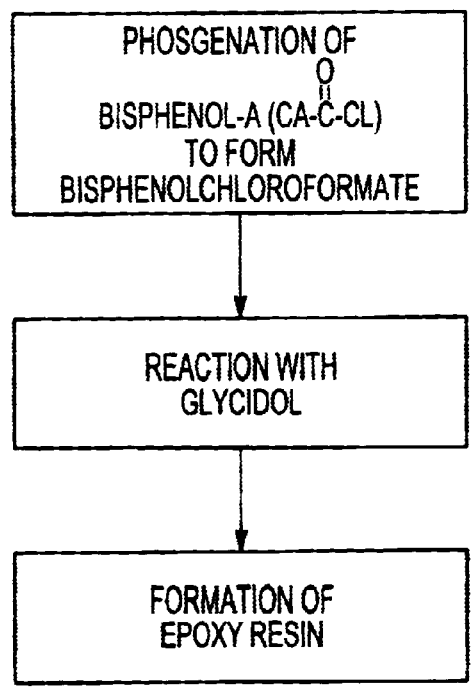
FIG. 2 illustrates a flow chart of a second example method of forming the lightfast epoxy resin of the present invention.

Alternatively, as illustrated in FIG. 2, the Bisphenol A bischloroformate is reacted with glycidol to produce the diglycidal ether of Bisphenol A bischloroformate. The glycidol also includes an oxirane ring. The glycidol attaches to opposing ends of the Bisphenol A bischloroformate, resulting in a lightfast epoxy resin having excellent viscosity and good processing properties.

Figure 3:
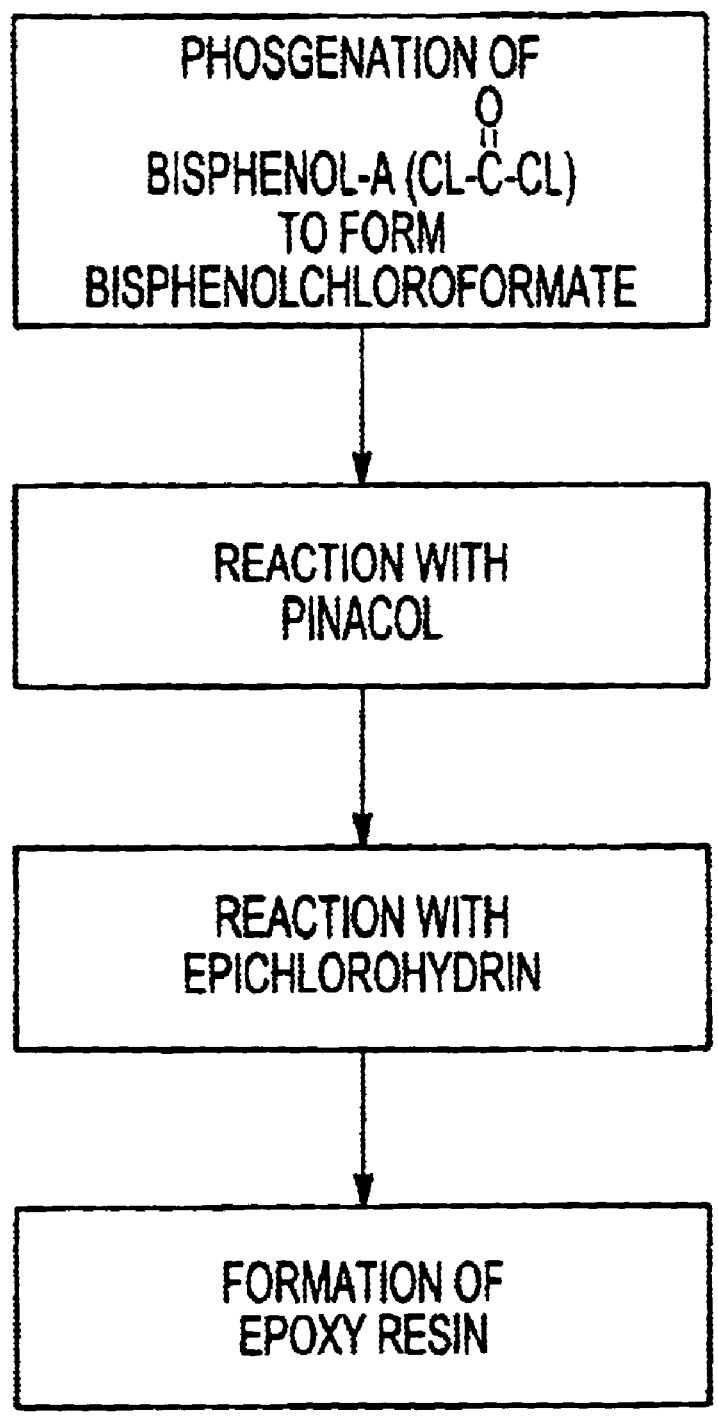
FIG. 3 illustrates a flow chart of a third example method of forming the lightfast epoxy resin of the present invention.

Alternatively, as illustrated in the flowchart of FIG. 3, the Bisphenol A bischloroformate is reacted with pinacol after the phosgenation of the Bisphenol A to form dipinacolether of Bisphenol A bischloroformate. The dipinacolether of Bisphenol A bischloroformate is a building block of the epoxy resin which can be reacted with another chemical to produce an epoxy resin. For example, as shown in FIG. 3, the dipinacolether of Bisphenol A bischloroformate is reacted with epichlorohydrin to produce a lightfast epoxy resin having an increased viscosity. The dipinacolether of Bisphenol A bischloroformate can also be reacted with glycidol to produce a lightfast epoxy resin. Reacting the Bisphenol A bischloroformate with pinacol prior to the reaction with either epichlorohydrin or glycidol provides for additional corrosion resistance.

When exposed to ultraviolet light, the phosgene moiety of the epoxy resin of the present invention undergoes a Photo- Fries rearrangement to form an alpha hydroxy benzophenone, the ingredient found in suntan lotion. Alpha hydroxy benzophenone is stabilized by a mechanism called phototaumerism. In phototaumerism, the hydrogen of the hydroxy group wiggles and dissipates heat as energy, stabilizing the alpha hydroxy benzophenone and reducing degradation by sunlight. Phototaumerism reduces the changing of the mechanical properties of the epoxy resin when exposed to ultraviolet radiation.

The epoxy resins made from Bisphenol A bischloroformate must be purified. The reason is: when light is absorbed by a substituted Bisphenol A, the energy sits within the molecule for a period of time called the fluorescence lifetime. A quantum process called Resonance (Forrester) Excitations Energy Transfer moves the energy to a nearby (about 40 Angstrom) alpha hydroxy benzophenone. This quantum process can also efficiently transfer the energy to an impurity which competes for the energy with the alpha hydroxyl benzophenone. If the epoxy resin is not initially purified, the impurity can catalyze degradation. The resins can be inexpensively purified by distillation.

By phosgenating the Bisphenol A prior to the reaction with either epichlorohydrin, glycidol or pinacol, the resulting epoxy resin has improved lightfastness and is not degraded when exposed to sunlight.

When the prior art epoxy resin formed of Bisphenol A reacted with epichlorohydrin is applied to a vehicle, two coats of paint are often needed as the Bisphenol A tends to degrade in the sun and appears chalky. By phosgenating the Bisphenol A prior to the reaction with epichlorohydrin, glycidol or pinacol, degradation of Bisphenol A is reduced when exposed to ultraviolet light. Therefore, only one coat of paint is needed on the vehicle.

The phosgenated Bisphenol A reacted with epichlorohydrin, glycidol, or pinacol, used to form the epoxy resin of the present invention can be used in paints, coatings, and plastics. The epoxy resin of the present invention can be used on any vehicle, such as boats, cars and planes.

Although epichlorohydrin, glycidol, and pinacol have been disclosed as being reacted with the Bisphenol A bischloroformate to produce the lightfast epoxy resin of the present invention, it is to be understood that other materials can be reacted with the phosgenated Bisphenol A to produce a lightfast epoxy resin.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method for producing a lightfast epoxy resin comprising the steps of:
    phosgenating Bisphenol A with phosgene to produce Bisphenol A bischloroformate having a phosgene moiety;
    reacting said bisphenolbischlorformate with at least one chemical to produce said epoxy resin.
2. The method as recited in claim 1 wherein said at least one chemical is epichlorohydrin.
3. The method as recited in claim 1 wherein said at least one chemical is glycidol.
4. The method as recited in claim 1 wherein said at least one chemical includes pinacol and epichlorohydrin.
5. The method as recited in claim 4 wherein said Bisphenol A bischloroformate is reacted with said pinacol prior to reaction with said epichlorohydrin.
6. The method as recited in claim 1 wherein said at least one chemical includes pinacol and glycidol.
7. The method as recited in claim 6 wherein said Bisphenol A bischloroformate is reacted with said pinacol prior to reaction with said glycidol.
8. The method as recited in claim 1 further comprising the step of mixing said epoxy resin with powder to produce a paint.
9. The method as recited in claim 8 further comprising the step of applying said paint to a vehicle.
10. The method as recited in claim 1 wherein said phosgene moiety is stabilized by phototaumerism.
11. The method as recited in claim 1 further comprising the step of purifying said epoxy resin.
12. The method as recited in claim 11 wherein said epoxy resin is purified by distillation.
13. A lightfast epoxy resin comprising:
    phosgenated Bisphenol A molecules; and
    at least one chemical which reacts with said phosgenated Bisphenol A molecules to form said epoxy resin.
14. The method as recited in claim 13 wherein said at least one chemical is epichlorohydrin.
15. The method as recited in claim 13 wherein said at least one chemical is glycidol.
16. The method as recited in claim 13 wherein said at least one chemical includes pinacol and epichlorohydrin.
17. The method as recited in claim 16 wherein said phosgenated Bisphenol A is reacted with said pinacol prior to reaction with said epichlorohydrin.
18. The method as recited in claim 13 wherein said at least one chemical includes pinacol and glycidol.
19. The method as recited in claim 18 wherein said phosgenated Bisphenol A is reacted with said pinacol prior to reaction with said glycidol.
20. The method as recited in claim 13 wherein said epoxy resin is purified.

* * * * *

UNITED STATES PATENT AND TRADEMARK OFFICE
CERTIFICATE OF CORRECTION

PATENT NO.    : 6,627,685 B2
DATED         : September 30, 2003
INVENTOR(S)   : Breskman It is certified that error appears in the above-identified patent and that said Letters Patent is hereby corrected as shown below:

<u>Column 4,</u>
Line 7, "bisphenolbischlorformate" should be -- bisphenolbischloroformate --

Signed and Sealed this

Eighteenth Day of November, 2003

JAMES E. ROGAN
*Director of the United States Patent and Trademark Office*